United States Patent [19]

Sanada et al.

[11] Patent Number: 5,175,211
[45] Date of Patent: Dec. 29, 1992

[54] THERMOPLASTIC RESIN COMPOSITION

[75] Inventors: Takashi Sanada; Kaoru Kitadono; Yasurou Suzuki; Taichi Nishio; Hiroomi Abe; Noriyasu Kagawa, all of Chiba, Japan

[73] Assignee: Sumitomo Chemical Co., Ltd., Osaka, Japan

[21] Appl. No.: 702,323

[22] Filed: May 17, 1991

Related U.S. Application Data

[63] Continuation-in-part of Ser. No. 337,474, Apr. 13, 1989, abandoned.

[30] Foreign Application Priority Data

Apr. 14, 1988 [JP] Japan ................................ 63-93221

[51] Int. Cl.⁵ .......................... C08L 51/04; C08L 77/02
[52] U.S. Cl. .......................................... 525/66; 525/68; 525/148; 525/152; 525/183; 525/184; 525/905
[58] Field of Search .................. 525/66, 68, 397, 905, 525/148, 152

[56] References Cited

U.S. PATENT DOCUMENTS 3,306,875 2/1967 Hay .
3,379,792 4/1968 Finholt .
4,315,086 2/1982 Ueno et al. .
4,338,421 7/1982 Maruyama et al. .

FOREIGN PATENT DOCUMENTS 0024120  2/1981  European Pat. Off. .
0225170  6/1987  European Pat. Off. .
0231626  8/1987  European Pat. Off. .
87-05311 9/1987  European Pat. Off. .
0237187  9/1987  European Pat. Off. .
0295103 12/1988  European Pat. Off. .
0184151  6/1986  Fed. Rep. of Germany .
45-997   1/1970  Japan .
53-47390 12/1978 Japan .
56-16525  2/1981 Japan .
56-26913  3/1981 Japan .
62-129350 6/1987 Japan .
62-151456 7/1987 Japan .
62-250050 10/1987 Japan .
8705304  9/1987  PCT Int'l Appl. .

Primary Examiner—Jacob Ziegler
Attorney, Agent, or Firm—Cushman, Darby & Cushman

[57] ABSTRACT

A thermoplastic resin composition comprises a polyphenylene ether having a reduced viscosity within the range of 0.30 dl/g or more and less than 0.45 dl/g, an aliphatic polyamide, a specified compatibilizing agent, and a rubber material. The composition has a high in heat distortion temperature and is superior in processability.

6 Claims, No Drawings

THERMOPLASTIC RESIN COMPOSITION

This is a continuation-in-part application of Ser. No. 07/337,474 filed Apr. 13, 1989, now abandoned.

The present invention relates to a resin composition which contains a polyphenylene ether and a polyamide.

More particularly, it relates to a novel thermoplastic resin composition high in heat distortion temperature and superior in processability which comprises a polyphenylene ether, an aliphatic polyamide, a specific compatibilizing agent and a rubber-like material and/or a modified rubber-like material as an impact strength modifier, wherein said polyphenylene ether has a specific reduced viscosity.

The thermoplastic resin composition of the present invention can be made into shaped articles, sheets, etc. by injection molding, extrusion molding, etc.

Resin compositions comprising a polyphenylene ether and a polyamide such as nylon 6 or 66 have been known, as disclosed in Japanese Patent Publication (Kokoku) Nos. 45-997 and 53-47390, Japanese Patent Publication (Kokai) Nos. 56-16525, 56-26913, 62-151456, 62-129350 and 62-250050 and U.S. Pat. No. 4,315,086.

These resin compositions have been known to be useful resin compositions which offset defects of the two resin components, for example, low processability and low solvent resistance of the polyphenylene ether and low heat resistance and high water absorbency of the polyamide.

Furthermore, these resin compositions contain as a main component a polyphenylene ether which is highly heat resistant non-crystalline resin and hence have the feature that high-load heat distortion temperature is higher than that of crystalline aliphatic polyamide itself. Thus, they are recently extended to a wide range of applications such as electric parts, mechanical parts, sports goods, automobile parts, especially exterior parts.

However, resin compositions comprising a rubber-like material in addition to a polyphenylene ether and an aliphatic polyamide to improve impact strength suffer from reduction of heat distortion temperature, and improvement has been desired.

An object of the present invention is to provide a resin composition comprising a polyphenylene ether, an aliphatic polyamide and a rubber-like material as an impact strength modifier, which is improved in heat distortion temperature.

Resin compositions containing a polyphenylene ether and an aliphatic polyamide normally increase or decrease in high-load heat distortion temperature (heat distortion temperature at a fiber stress of 18.6 kg/cm² in accordance with ASTM D648) depending on increase or decrease in content of polyphenylene ether. Therefore, decrease in high-load heat distortion temperature caused by addition of a rubber-like material can be easily improved by increasing polyphenylene ether content and complementarily decreasing polyamide content in the compositions. However, the compositions obtained in this manner have the significant defects that melt-flow characteristics are deteriorated and surface of injection-molded products is sometimes roughened. Moreover, a polyphenylene ether having a $\eta sp/c$ of about 0.5 dl/g or higher has been normally used for the known resin compositions comprising polyphenylene ether and a polyamide. In this respect, see Japanese Patent Publication (Kokoku) No. 60-11966, Japanese Patent Publication (Kokai) Nos. 56-49753, 61-204263, 61-204261 and 57-36150 and Japanese Patent Publication (Kohyo) No. 62-500458.

The inventors have made intensive researches in an attempt to improve high-load heat distortion temperature of resin compositions comprising (A) polyphenylene ether, (B) an aliphatic polyamide and (D) a rubber-like material without damaging melt flow characteristics, and as a result have found that a resin composition having excellent balance of properties and improved in high-load heat distortion temperature can be obtained by using a polyphenylene ether having a reduced viscosity ($\eta sp/c$) within the range of 0.30 dl/g or more and less than 0.45 dl/g and further using (C) a specific compatibilizing agent.

That is, the present invention relates to a thermoplastic resin composition which comprises:

(A) 30–70 parts by weight of a polyphenylene ether having a reduced viscosity ($\eta sp/c$) within the range of 0.30 dl/g or more and less than 0.45 dl/g measured in a chloroform solution having a concentration of 0.5 g/dl at 25° C., a mixture of said polyphenylene ether and polystyrene or a graft copolymer of said polyphenylene ether and styrene.

(B) 70–30 parts by weight of an aliphatic polyamide.

(C) 0.01–30 parts by weight, based on 100 parts by weight of the total of the above components (A) and (B), of at least one compound selected from the group consisting of oxazolines and compounds containing, in its molecule, (a) a carbon-carbon double bond or a carbon-carbon triple bond and (b) at least one functional group selected from the group consisting of carboxyl group, acid anhydride group, amino group, acid amide group, imido group, epoxy group, carboxylate ester group, isocyanate group, methylol group, oxazolidine group and hydroxyl group as a compatibilizing agent [component (C) hereinafter referred to as "compatibilizing agent"], and (D) 3–60 parts by weight, based on 100 parts by weight of the total of the above components (A), (B) and (C), of a rubber-like material and/or a modified rubber-like material as an impact strength modifier.

The polyphenylene ether used in the present invention is a homopolymer or a copolymer composed of the following repeating unit (I) or (I) and (II):

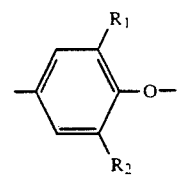

(I)

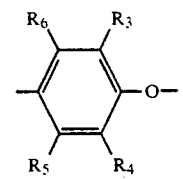

(II)

wherein $R_1$, $R_2$, $R_3$, $R_4$, $R_5$ and $R_6$ which may be identical or different each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

The polyphenylene ether may be a mixture of said homopolymer and said copolymer, a mixture of said polymer and polystyrene, or a graft copolymer of said polymer with styrene or the like.

The homopolymer of polyphenylene ether includes poly(2,6-dimethyl-1,4-phenylene)ether, poly(2-methyl-6-ethyl-1,4-phenylene)ether, poly (2,6-diethyl-1,4-phenylene)ether, poly(2-ethyl-6-n-propyl-1,4-phenylene)ether, poly (2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene) ether, poly(2-methyl-6-hydroxyethyl-1,4-phenylene) ether and poly(2-methyl-6-chloroethyl-1,4-phenylene) ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol which is represented by the formula (III):

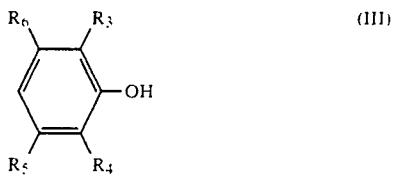

wherein $R_3$, $R_4$, $R_5$ and $R_6$ each represents a monovalent residue such as an alkyl group of 1-4 carbon atoms excluding tert-butyl group, an aryl group, a halogen atom or a hydrogen atom, and $R_3$ and $R_5$ cannot be simultaneously hydrogen atom.

The aliphatic polyamides of component (B) used in the present invention may be those known in the art. The aliphatic polyamides have a molecular weight of 10,000 or more and can be produced by bonding of equimolar of a saturated aliphatic dicarboxylic acid of 4-12 carbon atoms and an aliphatic diamine of 2-12 carbon atoms. However, in the production, if necessary, the diamines may be excessively used so as to provide more amine terminal groups than carboxyl terminal groups in the polyamide, or alternatively, a dibasic acid may be excessively used so as to provide more acid groups. Similarly, these polyamides can be conveniently produced from acid production derivatives and amine production derivatives such as esters, acid chlorides and amine salts, of the above mentioned acids and amines.

Typical examples of the aliphatic dicarboxylic acid used for production of the polyamides include adipic acid, pimelic acid, azelaic acid, suberic acid, sebacic acid and dodecanedioic acid.

On the other hand, typical examples of the aliphatic diamines include hexamethylenediamine and octamethylenediamine.

In addition, the aliphatic polyamides may also be produced by self-condensation of lactam.

Examples of the aliphatic polyamides are polyhexamethylene adipamide (nylon 66), polyhexamethylene azelamide (nylon 69), polyhexamethylene sebacamide (nylon 610), polyhexamethylene dodecanoamide (nylon 612), poly-bis-(p-aminocyclohexyl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids selected from those used for production of the above-mentioned polymers, for example, polymers produced from adipic acid, sebacic acid and hexamethylenediamine. The aliphatic polyamides further include blends of above-mentioned polyamides such as a blend of nylon 6 and nylon 66 including copolymers such as nylon 66/6.

Preferably, the aliphatic polyamides used in the present invention are polyhexamethylene adipamide (nylon 66), polycaprolactam (nylon 6) and a blend of polyhexamethylene adipamide (nylon 66) with polycaprolactam (nylon 6).

The compatibilizing agent of component (C) used in the present invention is at least one compound selected from the group consisting of oxazolines and compounds having in its molecule (a) carbon-carbon double bond or carbon-carbon triple bond and (b) at least one functional group selected from carboxyl group, acid anhydride group, amino group, acid amide group, imido group, epoxy group, carboxylate group, isocyanate group, methylol group, oxazolidine group and hydroxyl group.

Examples of the compatibilizing agent are maleic anhydride (MAH), maleic acid, fumaric acid, maleimide, maleic hydrazide, reaction products of maleic anhydride and diamines, e.g., those having the structure represented by

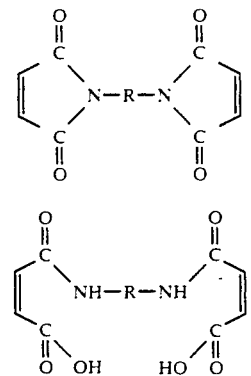

wherein R represents an aliphatic or aromatic group; methyl nadic anhydride, dichloromaleic anhydride, maleinamide; natural fats and oils such as soybean oil, tung oil, caster oil, linseed oil, hempseed oil, cottonseed oil, sesame oil, rapeseed oil, peanut oil, tsubaki oil, olive oil, coconut oil and sardine oil; epoxidized natural fats and oils such as epoxidized soybean oil; unsaturated carboxylic acids such as acrylic acid, butenoic acid, crotonic acid, vinylacetic acid, itaconic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid; 4-methylcyclohexa-4-ene-1,2-dicarboxylic acid anhydride (4-MTHPA), 1,2,3,4,5,8,9,10-octahydronaphthalene-2,3-dicarboxylic acid anhydride, bicyclo(2,2,2)octa-5-ene-2,3-dicarboxylic acid anhydride (BODA), bicyclo(2,2,1)octa-7-ene-2,3,5,6-tetracarboxylic acid-2,3,5,6-dianhydride, maleo-pimaric acid (M-PA), bicyclo(2,2,1)hepta-5-ene-2,3-dicarboxylic acid anhydride (NBDA), X-methylbicyclo(2,2,1)hepta-5-ene-2,3-dicarboxylic acid anhydride (XMNA), 7-oxabicyclo (2,2,1)hepta-5-ene-2,3-dicarboxylic acid anhydride, or esters, acid amides and anhydrides of these unsaturated carboxylic acids; unsaturated alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, and $C_nH_{2n-9}OH$ (wherein n is a positive integer), 3-butene 1,2-diol, 2,5-dimethyl-3-hexene-2,5-diol, 1,5-hexadiene-3,4-diol and 2,6-octadiene-4,5-diol; unsaturated amines prepared by substituting the OH group of these unsaturated alcohols with —$NH_2$ group; glycidyl acrylate (GA), glycidyl methacrylate (GMA), and allyl glycidyl ether.

It is needless to say that the compatibilizing agent (C) includes compounds containing two or more double bonds or triple bonds of the above group (a) and two or more identical or different functional groups of the above (b). Furthermore, it is also possible to use as the compatibilizing agent (C) two or more of the above-mentioned compounds in combination.

Suitably, the compatibilizing agents (C) are maleic anhydride, maleic acid, fumaric acid, itaconic acid, glycidyl acrylate, glycidyl methacrylate and allyl glycidyl ether.

In the present invention, there is used (D) rubber-like materials such as elastomers and polyolefin resins having low flexural modulus and/or modified rubber-like materials as impact strength modifier.

Examples of the rubber-like materials are ethylene propylene rubber, ethylene propylene non-conjugated diene rubber, ethylene butene rubber, propylene butene rubber, isoprene butylene rubber, polyisoprene, polybutadiene, styrene butadiene rubber, styrene butadiene styrene block copolymer, partially hydrogenated styrene butadiene block copolymer, styrene isoprene block copolymer, partially hydrogenated styrene isoprene block copolymer, and linear low-density polyethylene and mixture thereof.

The modified rubber-like materials are those obtained by modifying the above-mentioned rubber-like materials with the compatibilizing agent (C). Examples of the modified rubber-like materials are maleic anhydride grafted ethylene propylene rubber, maleic anhydride grafted styrene butadiene styrene block copolymer, maleic anhydride grafted partially hydrogenated styrene butadiene styrene block copolymer, and glycidyl methacrylate grafted ethylene propylene rubber.

The rubber-like material further includes copolymers with the compatibilizing agent such as ethylene-acrylate-maleic anhydride terpolymer, ethylene-acrylate-glycidyl methacrylate terpolymer, ethylene-vinyl acetate-glycidyl methacrylate terpolymer and mixtures thereof.

Among the component (D), preferred are ethylene propylene rubber, ethylene butene rubber, styrene butadiene styrene block copolymer, partially hydrogenated styrene butadiene styrene block copolymer, styrene isoprene styrene block copolymer, partially hydrogenated styrene isoprene styrene block copolymer, linear low-density polyethylene having a density of 0.885–0.935 g/cm$^3$, preferably 0.885–0.925 g/cm$^3$. Also preferred are ethylene-methyl acrylate-maleic anhydride terpolymer, ethylene-ethyl acrylate-maleic anhydride terpolymer, ethylene-vinyl acetete-glycidyl methacrylate terpolymer, ethylene-methyl acrylate-glycidyl methacrylate terpolymer and mixtures thereof.

Further, the compatibilizing agent used for modifying the rubber-like material is especially preferably one which reacts with a compatibilizing agent which is to be used as component (C). For example, when unsaturated carboxylic acids or acid anhydrides such as maleic anhydride (MAH), maleic acid, fumaric acid, itaconic acid, acrylic acid and bicyclo(2.2.1)hepta-5-ene-2,3-dicarboxylic acid anhydride (NBDA) are used as the compatibilizing agent (C), it is preferred to modify the rubber-like material with epoxy group-containing unsaturated monomers such as glycidyl acrylate (GA), glycidyl methacrylate (GMA), and allylglycidyl ether, unsaturated alcohols such as allyl alcohol and crotyl alcohol, unsaturated amines such as aliylamine and diallylamine, or phenols.

When unsaturated alcohols such as allyl alcohol and crotyl alcohol are used as compatibilizing agent (C), it is preferred to modify the rubber-like material with epoxy group-containing unsaturated monomers such as glycidyl acrylate, glycidyl methacrylate and allylglycidyl ether, unsaturated carboxylic acids or acid anhydrides such as maleic anhydride, maleic acid, fumaric acid, itaconic acid, acrylic acid and NBDA, or maleimide.

When epoxy group-containing unsaturated monomers such as glycidyl acrylate, glycidyl methacrylate and allylglycidyl ether are used as compatibilizing agent (C), it is preferred to modify the rubber-like material with such unsaturated carboxylic acids or acid anhydrides as exemplified above, such unsaturated amines as exemplified above, such unsaturated alcohols as exemplified above or maleimide.

When such unsaturated amines as exemplified above are used as compatibilizing agent (C), it is preferred to modify the rubber-like material with such epoxy group-containing unsaturated monomers as exemplified above or such unsaturated carboxylic acids or acid anhydrides as exemplified above.

Amount of component (D) is preferably 3–60 parts by weight based on 100 parts by weight of the total of components (A), (B) and (C).

Blending method of the components (A), (B) and (C) and (D) rubber-like material and/or modified rubber-like material which is an impact strength modifier is not limited, and only known melt kneading method can be used. Extruders, kneaders, rolls and the like, preferably extruders can be used as melt kneading apparatuses. There is not special limitation in sequence of addition of the components upon melt kneading. That is, any of the following methods may be employed: a method which comprises adding all of components (A), (B), (C) and (D) at the same time and simultaneously melt kneading them, a method which comprises previously melt kneading components (A), (C) and (D) in the presence or absence of a free-radical initiator and then adding component (B) and melt kneading them, a method which comprises previously melt kneading components (A) and (C) in the presence or absence of a free-radical initiator and then adding components (B) and (D) and melt kneading them, and a method which comprises previously melt kneading components (C) and (D) in the presence of a free-radical initiator and then adding components (A) and (B) and melt kneading them.

In the present invention, the blending ratio of components (A), (B) and (C) is 30–70 parts by weight of component (A), 70–30 parts by weight of component (B) and 0.01–30 parts by weight of component (C) based on 100 parts by weight of the total of components (A) and (B). If amount of component (C) is less than 0.01 part by weight, mechanical strength of the thermoplastic resin is deteriorated and the desired effect of the present invention cannot be obtained. If more than 30 parts by weight, appearance of molded product is inferior.

The polyphenylene ether of component (A) has a reduced viscosity ($\eta sp/c$) of 0.30 dl/g or more and less than 0.45 dl/g, preferably 0.30 dl/g or more and less than 0.40 dl/g, measured at 25° C. in a chloroform solution of 0.5 g/dl in concentration. If the reduced viscosity is less than 0.30 dl/g, mechanical strength, especially impact strength of the resulting thermoplastic resin composition decreases and the desired object cannot be attained. If 0.45 dl/g or more, effect to improve high-load heat distortion temperature is markedly decreased.

The resin composition of the present invention may further contain ordinary fillers such as glass fiber, glass flake, talc and mica, dyes, pigments, ultraviolet degradation inhibitors, heat stabilizers, flame-retardants, antioxidants, plastisizers and the like.

The molded products obtained from the thermoplastic resin composition of the present invention can be used suitably for automobile parts and electrical and electronic parts.

As examples of automobile parts to which the composition of the present invention can be applied, mention may be made of exterior trim parts such as bumper, fender, apron, hood panel, fascia, rocker panel, rocker panel reinforce, floor panel, rear quarter panel, door panel, door support, roof top, and trunk lid, interior trim parts such as instrument panel, console box, glove box, shift knob, pillar garnish, door trim, handle, arm rest, wind louver, carpet, head rest, seat belt, and seat, interior parts of engine room such as distributor cap, air cleaner, radiator tank, battery case, radiator shroud, washer tank, cooling fan, and heater case, mirror body, wheel cover, trunk trim, trunk mat and gasoline tank.

The following examples further illustrate the present invention, but the present invention is not limited to them.

In the examples, reduced viscosity ($\eta sp/c$) of polyphenylene ether was measured at 25° C. in a chloroform solution of 0.5 g/dl. Melt flow rate, heat distortion temperature (HDT), Izod impact strength with notch (NI) and flexural modulus of the resin composition were measured according to JIS K7210 (280° C., 10 kg), ASTM D648, D256 and D790, respectively.

Any of the resin compositions to be subjected to injection molding for preparation of test pieces was subjected to vacuum-drying at 120° C. for 6 hours prior to use. Properties of test pieces were measured after they were left to stand for 48 hours in an air atmosphere of 23° C. and 50% R.H.

Dumbbell specimens of ASTM standard were molded under the injection molding conditions of cylinder temperature 290° C. and mold temperature 80° C. Injection molding machine was IS 150E manufactured by Toshiba Machine Co., Ltd.

REFERENCE EXAMPLE 1

(Preparation of polyphenylene ether in accordance with the process disclosed in Japanese Patent Publication (Kokoku) No. 60-46129)

A reactor of 1.5 m$^3$ was charged with 122.2 kg of 2,6-dimethylphenol, 366.5 kg of xylene, 122.2 kg of methanol, 2.4 kg of sodium hydroxide, 0.33 kg of Eriochrome Black T manufactured by Nakarai Kagaku Yakuhin Kabushiki Kaisha, 1.49 kg of 2-pipecoline and 0.059 kg of manganese chloride tetrahydrate. Air was blown into the reactor at a rate of 300 Nl/min. for 10 hours with stirring the mixture to effect oxidation polymerization reaction. During the reaction, temperature of reaction mixture was kept at 30° C. and pressure of reaction system was kept at 8 kg/cm$^2$G. After termination of the reaction, post-treatment was conducted by ordinary method to obtain 119 kg of poly(2,6-dimethyl-1,4-phenylene)ether having a reduced viscosity of 0.416 dl/g.

Polyphenylene ethers different in reduced viscosity referred to hereinafter were prepared in accordance with this Reference Example 1.

REFERENCE EXAMPLE 2

(Preparation of maleic anhydride grafted ethylene-propylene rubber EPR)

100 parts by weight of EPR, i.e., Esprene ® E-120 manufactured by Sumitomo Chemical Co., Ltd., 1.5 parts by weight of styrene monomer, 1.5 parts by weight of maleic anhydride and 0.1 part by weight of a free-radical initiator, i.e., dicumyl peroxide (DCP) manufactured by Nippon Oil & Fats Co., Ltd. were previously mixed well using Henschel mixer, and then extruded by the same twin-screw extruder manufactured by Nippon Seikosho Kabushiki Kaisha as used in the following Examples. Cylinder temperature was set at 230° C. and screw speed was set at 190 rpm.

REFERENCE EXAMPLE 3

(Preparation of maleic anhydride grafted partially hydrogenated styrene butadiene styrene block copolymer)

Modification with maleic anhydride was effected in the same manner as in Reference Example 2 except that a partially hydrogenated styrene butadiene styrene block copolymer, i.e., Kraton ® G1650 manufactured by Shell Chemical Co. was used in place of EPR.

In all of the following Examples and Comparative Examples, kneading was carried out by twin-screw extruder TEX 44 manufactured by Nippon Seikosho Kabushiki Kaisha. This extruder had L/D=32 and was provided with a first feed opening and with a second feed opening at the position of L/D=16.

EXAMPLE 1

The polyphenylene ether prepared in Reference Example 1, maleic anhydride as a compatibilizing agent, the maleic acid grafted ethylene-propylene rubber prepared in Reference Example 2 as a modified rubber-like material and dicumyl peroxide, Sanperox ® DCP manufactured by Sanken Kako Co. were previously mixed well using a tumbler mixer and the mixture was fed from the first feed opening of the twin-screw extruder. From the second opening were fed polyamide, 0.5 part by weight, based on 100 parts by weight of the total of polyphenylene ether, maleic anhydride grafted ethylene-propylene rubber and polyamide, of 2-t-butyl-6-[3'-t-butyl-5'-methyl-2'-hydroxybenzyl]4-methylbenzyl acrylate, i.e., Sumilizer GM manufactured by Sumitomo Chemical Co., Ltd. as an antioxidant, and 0.5 part by weight, based on 100 parts by weight of the total of polyphenylene ether, maleic anhydride grafted ethylene-propylene rubber and polyamide, of pentaerythritol-tetrakis (8-lauryl thiopropionate), i.e., Sumilizer ® TPD manufactured by Sumitomo Chemical Co., Ltd., and kneading was effected.

Cylinder temperature was set at 260° C. and screw speed was set at 360 rpm. Mixing ratio of raw materials was that shown in Table 1.

Commercially available nylon 6, i.e., A1030 BRL manufactured by Unitika Ltd. was used as an aliphatic polyamide.

EXAMPLE 2

A resin composition was prepared at the same mixing ratio and under the same extrusion conditions as in Example 1 except that poly(2,6-dimethyl-1,4-phenylene ether) having $\eta sp/c$ of 0.352 dl/g manufactured by Japan Polyether Co. was used as polyphenylene ether.

COMPARATIVE EXAMPLE 1

A resin composition was prepared at the same mixing ratio and under the same extrusion conditions as in Example 1 except that poly(2,6-dimethyl-1,4-phenylene ether) having $\eta sp/c$ of 0.527 dl/g manufactured by Japan Polyether Co. was used as polyphenylene ether.

EXAMPLE 3

A resin composition was prepared at the same mixing ratio and under the same extrusion conditions as in Example 1 except that nylon 66, i.e., Maraneel A-100 manufactured by ICI Corp. was used as an aliphatic polyamide.

COMPARATIVE EXAMPLE 2

A resin composition was prepared at the same mixing ratio and under the same extrusion conditions as in Example 3 except that poly(2,6-dimethyl-1,4-phenylene ether) having $\eta sp/c$ of 0.527 dl/g manufactured by Japan Polyether Co. was used as polyphenylene ether.

EXAMPLE 4

A resin composition was prepared at the same mixing ratio and under the same extrusion conditions as in Example 1 except that a partially hydrogenated styrene-butadiene-styrene block copolymer, i.e., Kraton G ® 1650 manufactured by Shell Chemical Co. was used in place of maleic anhydride grafted EPR and raw material components were all fed from the first feed opening.

COMPARATIVE EXAMPLE 3

A resin composition was prepared at the same mixing ratio and under the same extrusion conditions as in Example 4 except that poly(2,6-dimethyl-1,4-phenylene ether) having $\eta sp/c$ of 0.527 dl/g manufactured by Japan Polyether Co. was used as polyphenylene ether.

COMPARATIVE EXAMPLE 4

A resin composition was prepared at the same mixing ratio and under the same extrusion conditions as in Example 1 except that the maleic anhydride grafted partially hydrogenated styrene-butadiene-styrene block copolymer prepared in Reference Example 3 was used in place of maleic anhydride grafted EPR and neither maleic anhydride nor dicumyl peroxide was added.

COMPARATIVE EXAMPLE 5

A resin composition was prepared at the same mixing ratio and under the same extrusion conditions as in Comparative Example 4 except that poly(2,6-dimethyl-1,4-phenylene ether) having $\eta sp/c$ of 0.527 dl/g manufactured by Japan Polyether Co. was used as polyphenylene ether.

EXAMPLE 5

A resin composition was prepared at the same mixing ratio and under the same extrusion conditions as in Example 1 except that poly(2,6-dimethyl-1,4-phenylene ether) having 0sp/c of 0.390 dl/g manufactured by Japan Polyether Co. was used as polyphenylene ether.

EXAMPLE 6

A resin composition was prepared at the same mixing ratio and under the same extrusion conditions as in Example 1 except that poly(2,6-dimethyl-1,4-phenylene ether) having $\eta sp/c$ of 0.347 dl/g manufactured by Japan Polyether Co. was used as polyphenylene ether.

EXAMPLE 7

A resin composition was prepared at the same mixing ratio and under the same extrusion conditions as in Example 3 except that poly(2,6-dimethyl-1,4-phenylene ether) having 0sp/c of 0.347 dl/g manufactured by Japan Polyether Co. was used as polyphenylene ether.

EXAMPLE 8

Example 1 was repeated except that bicyclo(2.2.1-)hepta-5-ene-2,3-dicarboxylic acid anhydride grafted ethylene-propylene rubber (NBDA-EPR) was used in place of maleic anhydride grafted ethylene-propylene rubber (MAH-EPR). NBDA-EPR was prepared in the same manner as in preparation of MAH-EPR (Reference Example 2) except that NBDA was used in place of maleic anhydride.

EXAMPLE 9

Example 1 was repeated except that 4-methylcyclohexa-4-ene-1,2-dicarboxylic acid anhydride grafted ethylene-propylene rubber (4-MTHPA-EPR) was used in place of MAH-EPR. 4-MTHPA-EPR was prepared in the same manner as in preparation of MAH-EPR (Reference Example 2) except that 4-MTHPA was used in place of maleic anhydride.

EXAMPLE 10

Example 1 was repeated except that glycidyl methacrylate grafted ethylene propylene rubber (GMA-EPR) was used in place of MAH-EPR. GMA-EPR was prepared in the same manner as in preparation of MAH-EPR (Reference Example 2) except that GMA was used in place of maleic anhydride.

EXAMPLE 11

Example 10 was repeated except that glycidyl methacrylate was used in place of maleic anhydride as a compatibilizing agent.

EXAMPLE 12

Example 1 was repeated except that glycidyl methacrylate was used in place of maleic anhydride as a compatibilizing agent and NBDA-EPR was used in place of MAH-EPR.

EXAMPLE 13

Example 1 was repeated except that glycidyl methacrylate-ethylene-methyl acrylate copolymer (GMA-EMA; GMA 1.5 wt. %, E 56.5 wt. %, MA 42 wt. % manufactured by Sumitomo Chemical Co. Ltd.) was used in place of MAH-EPR.

Compositions and results of measurement of properties in these examples and comparative examples are shown in Tables 1 and 2.

Furthermore, plates having a width of 100 mm, a length of 400 mm and a thickness of 3 mm were molded from the compositions at 260° C. by means of an injection molding machine IS220 manufactured by Toshiba Machines Co., Ltd., and their appearance was evaluated. As a result, molded products having a smooth and glossy surface (an evaluation denoted by ○) were obtained from the present compositions, but jetting appeared on the surface (evaluations denoted by X or Δ) in the comparative examples. The results are shown in Tables 1 and 2.

The thermoplastic resin composition of the present invention which comprises, at a specific mixing ratio, a polyphenylene ether, an aliphatic polyamide, a compatibilizing agent and a rubber-like material is good in impact resistance of resulting molded product and is excellent in high-load heat distortion temperature and thus can be applied to various uses.

This novel resin composition provided by the present invention can be easily processed into shaped articles, sheets, films and the like by ordinary methods employed for thermoplastic resins such as injection molding and extrusion molding. These products have very good balances in properties such as impact resistance, heat resistance and flexural stiffness. The composition is especially useful for injection molding.

TABLE 1

| | Unit | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Polyphenylene ether (A) | wt. part | 50 | 50 | 50 | 50 | 50 | 50 | 50 | 50 | 50 |
| ηsp/c | dl/g | 0.42 | 0.35 | 0.42 | 0.42 | 0.53 | 0.53 | 0.53 | 0.42 | 0.53 |
| Impact strength modifier (D) | wt. part | mEPR 10 | mEPR 10 | mEPR 10 | SEBS 10 | mEPR 10 | mEPR 10 | SEBS 10 | mSEBS 10 | mSEBS 10 |
| Nylon 6 (B) | " | 40 | 40 | — | 40 | 40 | — | 40 | 40 | 40 |
| Nylon 66 (B) | " | — | — | 40 | — | — | 40 | — | — | — |
| Maleic anhydride (C) | " | 0.5 | 0.5 | 0.5 | 0.5 | 0.5 | 0.5 | 0.5 | — | — |
| DCP | " | 0.01 | 0.01 | 0.01 | 0.01 | 0.01 | 0.01 | 0.01 | — | — |
| Sumilizer ® GM | " | 0.5 | 0.5 | 0.5 | 0.5 | 0.5 | 0.5 | 0.5 | 0.5 | 0.5 |
| Sumilizer ® TPD | " | 0.5 | 0.5 | 0.5 | 0.5 | 0.5 | 0.5 | 0.5 | 0.5 | 0.5 |
| Flexural modulus | kg/cm² | 21200 | 21500 | 22100 | 21500 | 20900 | 21800 | 21100 | 21600 | 21000 |
| Izod with notch | kg · cm/cm² | 35 | 21 | 26 | 30 | 48 | 35 | 43 | 13 | 15 |
| High-load heat distortion temperature | °C. | 125 | 130 | 155 | 131 | 112 | 146 | 124 | 133 | 123 |
| Melt flow rate | g/10 min. | 41 | 51 | 62 | 43 | 28 | 38 | 33 | 67 | 43 |
| Appearance | | ○ | ○ | ○ | ○ | Δ | Δ | Δ | X-Δ | X |

"mEPR" Maleic anhydride grafted ethylene propylene rubber (MAH-EPR).
"mSEBS" Maleic anhydride grafted partially hydrogenated styrene butadiene styrene block copolymer.
"DCP" Dicumyl peroxide.
○ good
Δ bad
X very bad

TABLE 2

| | Unit | Example 5 | Example 6 | Example 7 | Example 8 | Example 9 | Example 10 | Example 11 | Example 12 | Example 13 |
|---|---|---|---|---|---|---|---|---|---|---|
| Polyphenylene ether (A) | wt. part | 50 | 50 | 50 | 50 | 50 | 50 | 50 | 50 | 50 |
| ηsp/c | dl/g | 0.39 | 0.35 | 0.35 | 0.39 | 0.39 | 0.35 | 0.35 | 0.35 | 0.35 |
| Impact strength modifier (D) | wt. part | mEPR 10 | mEPR 10 | mEPR 10 | NBDA-EPR 10 | 4-MTHPA-EPR 10 | GMA-EPR 10 | mEPR 10 | NBDA-EPR 10 | GMA-EPR 10 |
| Nylon 6 (B) | " | 40 | 40 | — | 40 | 40 | 40 | 40 | 40 | 40 |
| Nylon 66 (B) | " | — | — | 40 | — | — | — | — | — | — |
| Compatibilizing agent (C) | | Maleic anhydride | Maleic anhydride | Maleic anhydride | Maleic anhydride | Maleic anhydride | Maleic anhydride | Glycidyl methacrylate | Glycidyl methacrylate | Glycidyl methacrylate |
| | " | 0.5 | 0.5 | 0.5 | 0.5 | 0.5 | 0.5 | 0.5 | 0.5 | 0.5 |
| DCP | " | 0.01 | 0.01 | 0.01 | 0.01 | 0.01 | 0.01 | 0.01 | 0.01 | 0.01 |
| Smilizer ® GM | " | 0.5 | 0.5 | 0.5 | 0.5 | 0.5 | 0.5 | 0.5 | 0.5 | 0.5 |

TABLE 2-continued

| | Unit | Example 5 | Example 6 | Example 7 | Example 8 | Example 9 | Example 10 | Example 11 | Example 12 | Example 13 |
|---|---|---|---|---|---|---|---|---|---|---|
| Smilizer Ⓡ TPD | " | 0.5 | 0.5 | 0.5 | 0.5 | 0.5 | 0.5 | 0.5 | 0.5 | 0.5 |
| Flexural modulus | kg/cm$^2$ | 21700 | 21800 | 22000 | 21750 | 21600 | 20700 | 20500 | 21000 | 20700 |
| Izod with notch | kg·cm/cm$^2$ | 33 | 20 | 19 | 35 | 36 | 40 | 42 | 37 | 35 |
| High-load heat distortion temperature | °C. | 130 | 133 | 160 | 125 | 124 | 128 | 125 | 127 | 127 |
| Melt flow rate | g/10 min. | 44 | 53 | 69 | 48 | 47 | 71 | 64 | 68 | 75 |
| Appearance | | | | | | | | | | |

"mEPR" Maleic anhydride grafted ethylene propylene rubber.
"NBDA-EPR" Bicyclo(2.2.1)hepta-5-ene-2,3 dicarboxylic acid anhydride grafted ethylene propylene rubber.
"4-MTHPA-EPR" 4-Methylcyclohexa-4-ene-1,2-dicarboxylic acid anhydride grafted ethylene propylene rubber.
"GMMA-EPR" Glycidyl methacrylate grafted ethylene propylene rubber.
"GMA-EMA" Glycidyl methacrylate-ethylene-methyl acrylate copolymer.
"DCP" Dicumyl peroxide
good

We claim:

1. A thermoplastic resin composition which comprises:
   (A) 30–70 parts by weight of a polyphenylene ether having a reduced viscosity ηsp/c within range of 0.30 dl/g or more and less than 0.45 dl/g measured in a chloroform solution having a concentration of 0.5 g/dl at 25° C., a mixture of said polyphenylene ether and polystyrene or a graft copolymer of said polyphenylene ether and styrene,
   (B) 70–30 parts by weight of an aliphatic polyamide,
   (C) 0.01–30 parts by weight, based on 100 parts by weight of the total of the above components (A) and (B), of at least one compound selected from the group consisting of oxazolines and compounds containing, in its molecule, (a) a carbon-carbon double bond or a carbon-carbon triple bond and (b) at least one functional group selected from the group consisting of carboxyl group, acid anhydride group, amino group, acid amide group, imido group, epoxy group, carboxylate ester group, isocyanate group, methylol group, oxazolidine group and hydroxyl group, as a compatibilizing agent, and
   (D) 3–60 parts by weight, based on 100 parts by weight of the total of the above components (A), (B) and (C), of at least one impact strength modifier selected from the group consisting of a rubber and a modified rubber.

2. A thermoplastic resin composition according to claim 1 wherein the polyphenylene ether (A) has a reduced viscosity ηsp/c of 0.30 dl/g or more and less than 0.40 dl/g.

3. A thermoplastic resin composition according to claim 1 wherein the polyphenylene ether (A) is one member selected from the group consisting of poly(2,6-dimethyl-1,4-phenylene ether) and a copolymer of 2,6-dimethylphenol and 2,3,6-trimethylphenol.

4. A thermoplastic resin composition according to claim 1 wherein the aliphatic polyamide (B) has an average molecular weight of 10,000 or more wherein the (B) is units of lactam, units of ω-amino acid of 4–12 carbon atoms, or units derived from aliphatic dicarboxylic acid containing 4–12 carbon atoms and aliphatic diamine containing 2–12 carbon atoms.

5. A thermoplastic resin composition according to claim 1 wherein the modified rubber (D) is a rubber modified with the compatibilizing agent (C).

6. A thermoplastic resin composition according to claim 1 or 5 wherein the compatibilizing agent (C) is a compound selected from the group consisting of maleic anhydride, maleic acid, fumaric acid, itaconic acid, glycidyl acrylate, glycidyl methacrylate and allylglycidyl ether.

* * * * *